April 12, 1960
R. M. KIRCHE
2,932,305
MIXING ATTACHMENT FOR FAUCETS
Filed Aug. 13, 1957
2 Sheets-Sheet 1
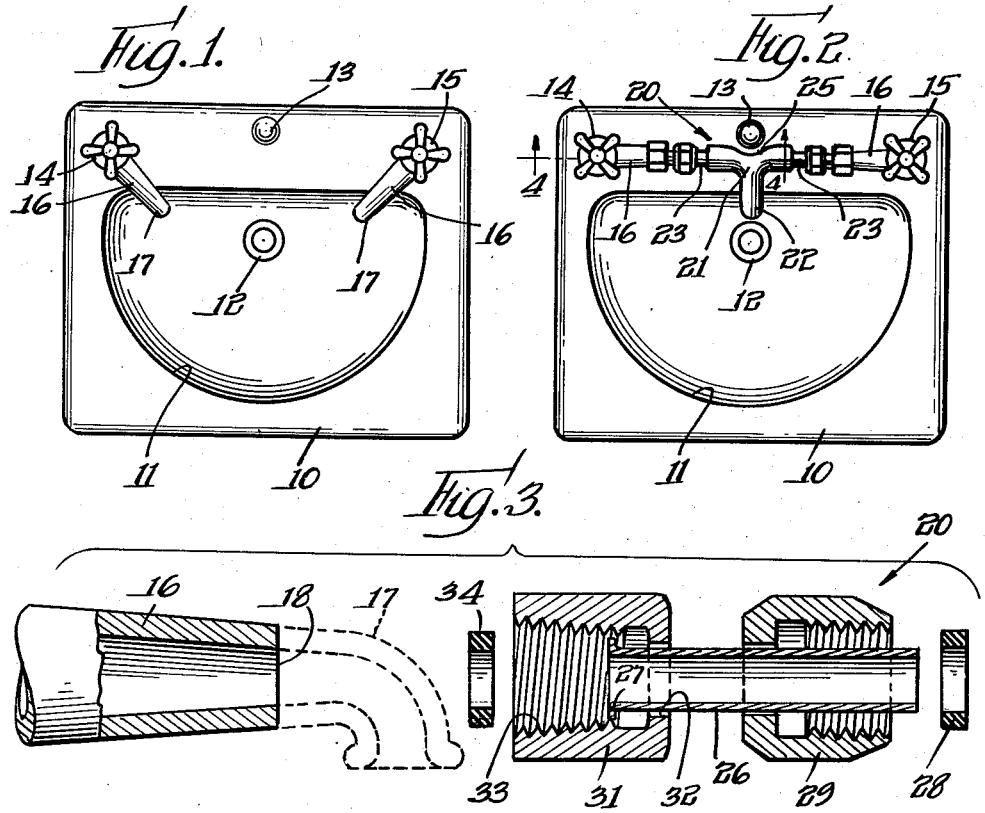
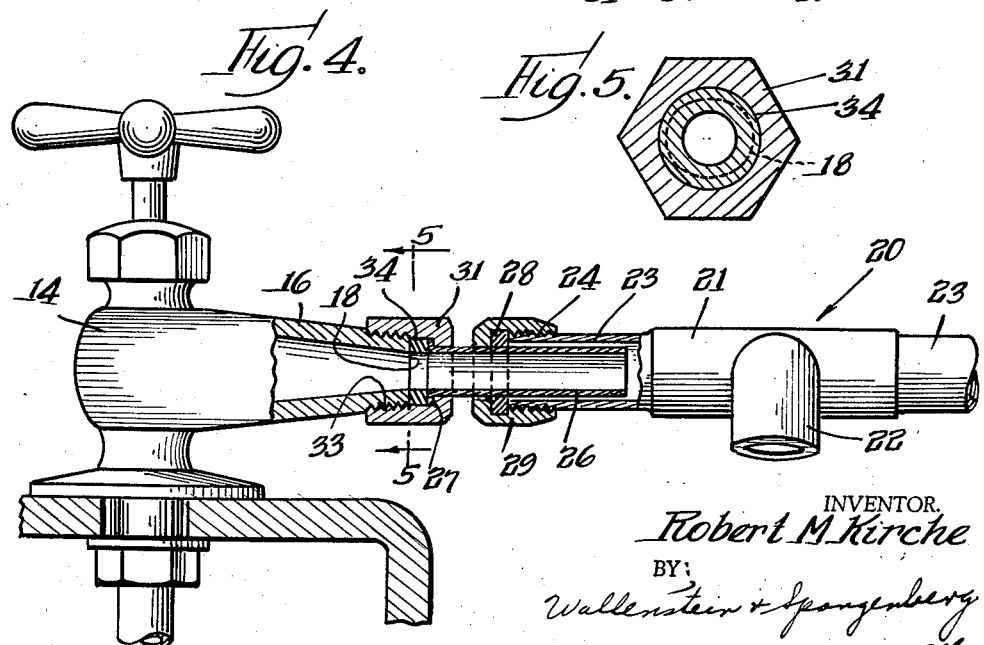
INVENTOR.
Robert M. Kirche
BY
Wallenstein + Spangenberg
Attys April 12, 1960 R. M. KIRCHE 2,932,305
MIXING ATTACHMENT FOR FAUCETS
Filed Aug. 13, 1957 2 Sheets-Sheet 2
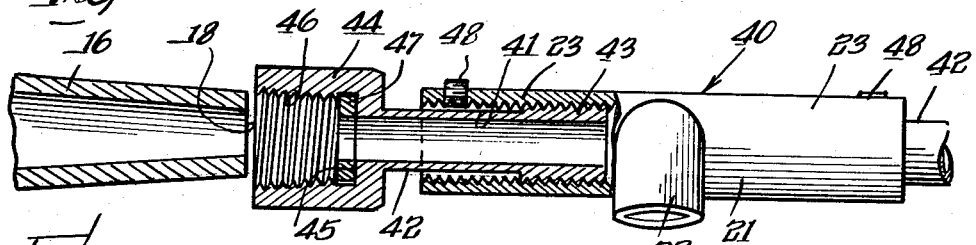
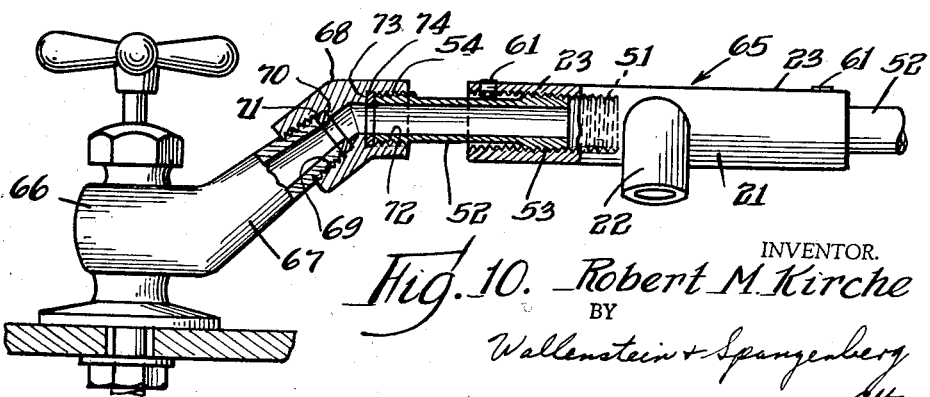
INVENTOR.
Robert M. Kirche
BY
Wallenstein + Spangenberg
Attys.

United States Patent Office 2,932,305
Patented Apr. 12, 1960

2,932,305

MIXING ATTACHMENT FOR FAUCETS

Robert M. Kirche, Chicago, Ill.

Application August 13, 1957, Serial No. 678,021

1 Claim. (Cl. 137—1)

The principal object of this invention is to provide an improved mixing attachment for hot and cold water faucets which may be readily, firmly, permanently and inexpensively attached to the faucets, which is adjustable for accommodating faucets having different spacings therebetween, which will not interfere with the drain control mechanism which is normally arranged between the hot and cold water faucets, and which provides a neat appearance when applied.

In accordance with this invention the bent down portions of the nozzles on the spaced apart hot and cold water faucets are removed, as by sawing or the like, and the faucets are turned to extend the shortened nozzles thereof toward each other. The mixing attachment is arranged between the shortened nozzles and it includes a nozzle member which communicates with the shortened nozzles of the faucets. Towards this end, the nozzle member adjustably carries a pair of tubes which carry nuts on their outer ends which in turn are threaded on the shortened nozzles for securing the mixing attachment in place thereon. Preferably, the nuts are self-threading nuts which are self-threaded on the shortened nozzles so that separate threading of the shortened nozzles is not required.

Suitable sealing washers are arranged within the nuts so as to seal the joints between the nuts and the shortened nozzles regardless of the cross sectional configurations of the shortened nozzles. Various ways of carrying the nuts on the tubes and of adjustably carrying the tubes in the nozzle member may be provided, and several preferred forms of so doing are disclosed herein. The nozzle member is also so shaped as not to interfere with the usual drain control mechanism.

Further objects of this invention reside in the details of construction of the mixing attachment, in the cooperative relationships between the component parts thereof, and in the relationships between the mixing attachment and the faucets.

Other objects and advantages of this invention will become apparent to those skilled in the art upon reference to the accompanying specification, claims and drawings in which:

Fig. 1 is a top plan view of a conventional sink or basin provided with the usual spaced apart hot and cold water faucets;

Fig. 2 is a view similar to Fig. 1 but illustrating the bent down portions of the nozzles of the spaced apart hot and cold water faucets removed and the mixing attachment of this invention applied to the shortened nozzles;

Fig. 3 is an exploded perspective view of a shortened nozzle of a foucet and of a portion of the mixing attachment;

Fig. 4 is a vertical sectional view through one of the faucets and a portion of the mixing attachment secured thereto and taken substantially along the line 4—4 of Fig. 2;

Fig. 5 is a vertical sectional view taken substantially along the line 5—5 of Fig. 4;

Figs. 6 and 7 are vertical sectional views through another form of the mixing attachment of this invention, Fig. 6 illustrating partial assembly and Fig. 7 illustrating complete assembly;

Figs. 8 and 9 are vertical sectional views through a further form of the mixing attachment of this invention, Fig. 8 illustrating partial assembly and Fig. 9 illustrating complete assembly; and Fig. 10 is a vertical sectional view through another form of mixing attachment of this invention which is shown as applied to another form of faucet.

Referring first to Figs. 1 and 2 there is illustrated a conventional sink or basin 10 having a bowl portion 11 with a drain 12 located in the bottom thereof. The drain 12 may be operated in any usual manner as by a drain control 13. Secured to the sink or basin 10 are the hot and cold water faucets 14 and 15, these faucets being of conventional form and being spaced apart and arranged on opposite sides of the drain control mechanism 13. As shown in Figs. 1 and 3 the faucets 14 and 15 are provided with the usual nozzle 16 which have bent down portions 17, the nozzles 16 facing over the bowl portion 11 of the sink or basin 10.

In accordance with the present invention the bent down portions 17 of the nozzles 16 of the spaced apart hot and cold water faucets 14 and 15 are removed by sawing or the like, as indicated at 18 in Fig. 3. The faucets 14 and 15 are turned to extend the shortened nozzles 16 thereof toward each other as illustrated in Fig. 2. One form of the mixing attachment of this invention is generally designated at 20 in Figs. 2, 3 and 4 and it is arranged between the turned shortened nozzles 16 of the valves 14 and 15. It includes a nozzle member 21 having a single discharge nozzle portion 22 and oppositely extending tubular legs 23 which communicate with the nozzle portion 22. The outer ends of the legs 23 are provided with screw threads 24. The rear of the nozzle member 21 is recessed as indicated at 25 in Fig. 2 to provide clearance for the drain control mechanism 13 so as not to interfere with the operation thereof.

The tubular legs 23 of the nozzle member 21 each slidably adjustably carry a tube 26, the outer ends of which are flared as indicated at 27. A packing gland in the form of a sealing washer 28 and a nut 29 screwed on to the screw threads 24 of the tubular legs 23 operates to seal the joint between the tube 26 and the tubular leg 23. The flared outer end of each tube 26 carries a nut 31, the nut 31 having a hole 32 in one end thereof for receiving the tube 26 with the flared end 27 of the tube 26 engaging within the nut 31. The nut 31 is internally provided with screw threads 33, the screw threads being tapered more than normal so as to more nearly conform to the shortened nozzles 16 and so as to be self-threading on the shortened nozzles 16. Preferably the nuts 31 are made from hardened steel to facilitate the self-threading on the shortened nozzles which are normally made from a softer metal. A sealing washer 34 is arranged within each nut 31 between the flared end 27 of the tube 26 and the end 18 of the shortened nozzle 16.

In applying the mixing attachment 20 to the shortened nozzles 16 the tubes 26 are adjusted with respect to the nozzle 21 so that the flared ends 27 thereof lie adjacent to the ends of the shortened nozzles 16. The nuts 31 having the sealing washers 34 therein are then threaded on to the shortened nozzles 16 and are drawn up tight to compress the sealing washer 34 between the ends 18 of the shortened nozzles 16 and the flared ends 27 of the tubes 26 to seal these joints. After this is done, then the nuts 29 of the packing glands are tightened to compress the sealing washers 28 for sealing the joints between the tubes 26 and the tubular legs 23 of the mixing member 21. The packing glands in addition to forming a sealing function also operate effectively to prevent rotation of the nozzle member 21 with respect to the tubes 26 and hence the shortened nozzles 16. In this way the nozzle member 21 is maintained in the desired position. The sealing washers 34 operate effectively to seal the shortened nozzles 16 regardless of the cross-sectional configuration thereof since the sealing washers 34 seal against the ends thereof. Because of the self-threading nature of the screw threads 33 of the nuts 31 the nuts 31 can be effectively threaded on to the shortened nozzles 16 regardless of their cross-sectional configuration. This feature of this invention is more clearly illustrated in Fig. 5 where the cross-sectional configuration of the shortened nozzles 16 is shown to be somewhat elliptical.

Another form of mixing attachment for application to the shortened nozzles 16 is generally designated at 40 in Figs. 6 and 7. It also includes a nozzle member 21 having a single nozzle outlet portion 22 and opposed tubular legs 23. The legs 23 are internally threaded as indicated at 41 and tubes 42 are adjustably carried in the tubular legs 23. In this respect the tubes 42 are threaded as indicated at 43 and are screw-threadedly received in the legs 23. Thus as the tubes 42 are rotated they move longitudinally within the legs 23. The outer ends of the tubes 42 carry nuts 44 which have an internal shoulder 45 and self-threading screw threads 46. Washers 47 are arranged within the nuts 44 and seat against the shoulders 45.

In applying the mixing attachment 40 to the shortened nozzles 16 the tubes 42 are adjustably positioned so that the outer faces of the nuts 44 just clear the ends 18 of the shortened nozzles 16. The nuts 44 are then self-threaded on to the shortened nozzles 16 and as they are being so threaded the tubes 42 are unscrewed outwardly with respect to the tubular legs 23. This is made possible since the direction of the threads 46 are made the same as the direction of the threads 43. In other words, the threads 43 and 46 may be right handed threads or they may be left hand threads. The nuts 44 are drawn up tight to compress the washers 47 between the shoulders 45 and the ends 18 of the shortened nozzles 16 for sealing the joints between the shortened nozzles 16 and the nuts 44. The joints between the tubes 42 and the tubular legs 23 of the nozzle member 21 are sealed by the coaction of the threads 41 and 43 and this seal is particularly effective when suitable sealing compound is applied thereto, such as red lead or the like. After the mixing attachment has been so assembled and the nozzle member 21 positioned correctly, the nozzle member 21 may be held in its correct position by tightening set screws 48 which may be of the Allen type.

A further form of mixing attachment is generally designated at 50 in Figs. 8 and 9. It also includes a nozzle member 21 having a single nozzle portion 22 and opposed tubular legs 23. Here the tubular legs 23 are also internally threaded as indicated at 51. Tubes 52 are adjustably received in the tubular legs 23, the tubes 52 having threaded portions 53 cooperating with the threads 51 in the tubular legs 23. Thus as the tubes 52 are rotated they are adjustably positioned in and out of the tubular legs 23. The outer ends of the tubes 52 are provided with screw threads 54. This mixing attachment also includes nuts 55 which have internal threads 56 for receiving the threaded ends 54 of the tubes 52. The nuts 55 are also provided with self-threading threads for attachment to the shortened nozzles 16. Cavities 58 are arranged within the nuts 55 between the threads 56 and 57 and arranged within the cavities 58 are sealing washers 59 and 60, the washer 59 being resilient and formed of rubber fiber, or the like and the washer 60 preferably being metal.

In assembling the mixing attachment 50 on the shortened nozzles 16 the nuts 55 are first threaded on to the shortened nozzles 16 to a point where the sealing washer 59 engages the end 18 of the shortened nozzle 16. The tubes 52 are then adjusted within the nozzle member 21 so that their ends just clear the nuts 55. The tubes 52 are then threaded into the threaded holes 56 in the nuts 55. This threading operation is permitted since the threads 54 are of the same direction as the threads 53. The tubular members 52 are threaded into the nuts 55 to a point where the outer ends of the tubes 52 engage the sealing washers 60 for compressing the sealing washers 59. Thus a tight seal is obtained between the ends of the shortened nozzles 16 and the ends of the tubes 52. Here also an effective seal is obtained between the tubes 52 and the tubular legs 23 by reason of the cooperating screw threads 51 and 53, particularly if the latter are provided with a suitable sealing compound. When the nozzle member 21 is adjusted to its desired position it may be maintained in this position by tightening the Allen set screws 61.

As shown in Fig. 10, some faucets 66 are provided with upwardly extending nozzles 67 as distinguished from horizontally extending nozzles and another form of mixing attachment is generally designated at 65 in Fig. 10 for attachment to such upwardly extending nozzles 67. Here also the turned down portions of the nozzles 67 have been removed as by sawing or the like so as to provide shortened nozzles. The mixing attachment 65 includes a nozzle member 21 having a single nozzle portion 22 and opposed tubular legs 23 which are internally threaded as indicated at 51. Tubes 52 having threaded portions 53 are screw threadedly received in the tubular legs 23 and the tubes 52 are provided with screw threads 54 at their outer ends. Here angular nuts 68 are utilized. The nuts 68 have self-threading threads 69 so as to be threaded on the shortened nozzles 67. The nuts 68 are provided with an internal shoulder 70 for receiving a sealing washer 71 for sealing the joints between the nuts 68 and the shortened nozzles 67. The nuts 68 also have internal threads 72 for receiving the threaded ends 54 of the tubes 52 and the nuts 68 are also provided with internal shoulders 73 for receiving a sealing washer 74 for sealing the joints between the nuts 68 and the tubes 52.

In assembling the mixing attachment 65 to the shortened nozzles 67 the nuts 68 are first threaded on to the nozzles 67 to an extent to compress the sealing washer 71 and seal the joints thereat. In so doing, the nuts 68 are so positioned that the threaded holes 72 thereof are horizontally arranged. The tubes 52 are then adjusted with respect to the nozzle member 21 so that the outer ends of the tubes 52 just clear the nuts 68. The tubes 52 are then threaded into the nuts 68, this being permitted by the unscrewing of the tubes 52 with respect to the nozzle member 21. The tubes 52 are threaded into the nuts 68 to an extent to compress the sealing washers 74 to seal the joints thereat. When the nozzle member 21 is properly positioned it is held in its proper position by tightening the Allen set screws 61.

The various parts of the various mixing attachments may have any desired cross-sectional configurations such as circular, hexagonal and the like. Preferably hexagonal configurations are used since they provide for ready gripping and ease of assembly. Also the various parts of the mixing attachments are chrome plated or the like so as to enhance the appearance thereof. In view of the foregoing it is seen that the mixing attachments of this invention may be readily, firmly, permanently and inexpensively attached to conventional spaced apart hot and cold water faucets, are adjustable for accommodating faucets having different spacings therebetween, will not interfere with the drain control mechanisms which are normally arranged between the hot and cold water faucets, and provide a neat appearance when applied. The use of the mixing attachments of this invention provides a single outlet nozzle for mixing hot and cold water to obtain desired water temperatures and in so doing provides for great savings in costs of water and in costs of heating water.

While for purposes of illustration, several forms of this invention have been disclosed, other forms thereof may become apparent to those skilled in the art upon reference to this disclosure and, therefore, this invention is to be limited only by the scope of the appended claim.

I claim as my invention:

The method of converting separate and spaced apart hot and cold water faucets, mounted on the top of a basin and having nozzles with bent down portions extending forwardly over the bowl portion of the basin, into a mixing faucet including a central mixing attachment having inlets at its ends, the distance between which is adjustable, and located above the basin and also having a pair of self-threading nuts at its inlet ends and an intermediate nozzle member extending forwardly over the bowl portion of the basin, comprising the steps of, removing the bent down portions of the nozzles of the faucets, positioning the faucets to extend the shortened nozzles thereof toward each other and longitudinally align the same, interposing the mixing attachment between the aligned shortened nozzles of the faucets with the intermediate nozzle member of the mixing attachment extending forwardly over the bowl portion of the basin, and threading the self-threading nuts at the inlet ends of the mixing attachment onto the aligned shortened nozzles of the faucets to communicate the aligned shortened nozzles of the faucets with the mixing attachment and to secure the mixing attachment in place on the aligned shortened nozzles of the faucets.

References Cited in the file of this patent

UNITED STATES PATENTS

| | | |
|---|---|---|
| 1,680,333 | Kooperstein | Aug. 14, 1928 |
| 1,832,723 | Mueller | Nov. 17, 1931 |
| 1,986,225 | Sefkin | Jan. 1, 1935 |
| 2,348,238 | Beeke | May 9, 1944 |
| 2,656,853 | Scheele | Oct. 27, 1953 |